Nov. 10, 1931.                F. W. GAY                1,830,938
APPARATUS FOR LIMITING ELECTRICAL CURRENTS
Filed Oct. 21, 1927
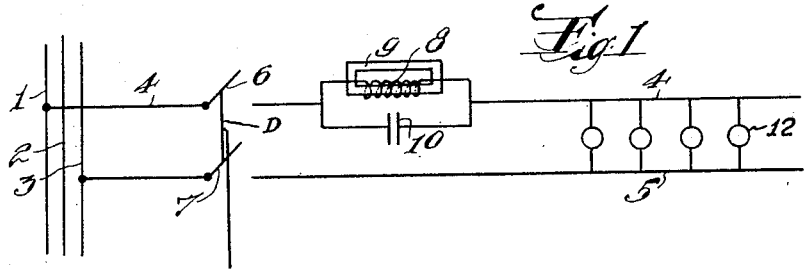
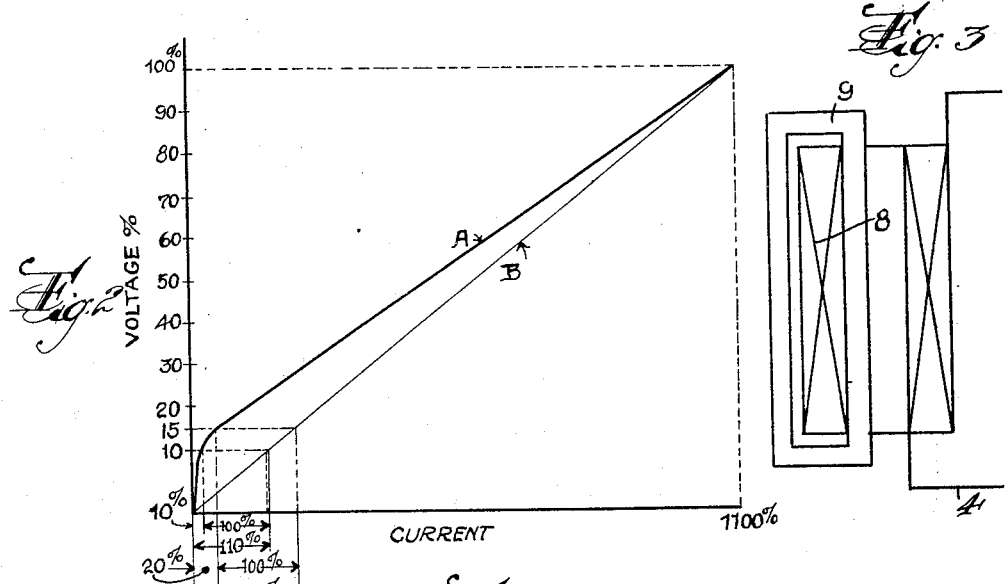
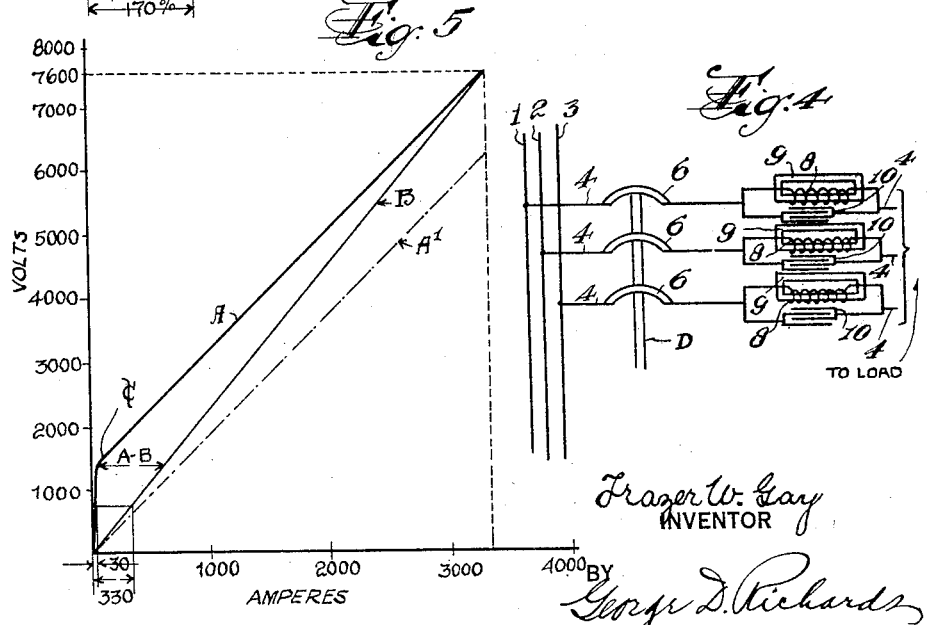
Frazer W. Gay
INVENTOR
BY George D. Richards
ATTORNEY Patented Nov. 10, 1931

1,830,938

UNITED STATES PATENT OFFICE

FRAZER W. GAY, OF NEWARK, NEW JERSEY, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA

APPARATUS FOR LIMITING ELECTRICAL CURRENTS

Application filed October 21, 1927. Serial No. 227,770.

This invention relates to a novel arrangement and construction of electric power delivery circuits provided with means for limiting the current flow therein and for regulating the voltage thereof. The invention relates more particularly to means for use in alternating current supply circuits for preventing surges of current on short circuits, and, especially for preventing or cutting down the tendency which current values in alternating current circuits have of surging and rising rapidly to greatly abnormal values even after the instigating short circuit has been opened. The invention also relates to a novel method of controlling and producing current values, in an alternating current circuit, within given limits under different conditions.

Heretofore, when it has been found necessary to limit the maximum current in an alternating current circuit it has been the practice to connect an impedance of constant value in the circuit. Of course, if the conditions which would occur on short circuit were known beforehand or predictable, it would be possible to design capacity reactance for such conditions to prevent undue fluctuations in characteristic values. But the nature of a possible short circuit is not predictable, and the probability that a possible short circuit will comprise a reactance of such characteristics as will, in series with the normal line reactance and a preventive capacity reactance, form a resonant circuit of low overall impedance is so great that capacity reactance is seldom used for current limiting purposes.

This limitation of the preventive impedance to the form of the conventional reactor is very serious because in an effective preventive reactor the voltage drop thereacross at normal line voltage is excessive and because, under short circuit conditions, the current surge from normal is inversely proportional to the ratio of normal reactor voltage drop to normal line voltage. For example, if a reactor of 5% line voltage drop at full load is used, the current allowed to pass to a dead short circuit adjacent the power house may approach twenty times normal current value. Such a possibility is highly unsatisfactory since, in the case of a heavy feeder such an excessively heavy current may seriously damage the external circuit or may throw a great strain on the circuit opening devices in series with the shorted feeder, or may even interfere with service to other feeders out of the power house that are not themselves in trouble. Furthermore at normal full load the 5% drop in the reactor will add directly to the drop caused by normal line reactance, generally 5% to 10%, and thus at low power factor the drop in voltage at the customer's load may approach 10% to 15%, a drop so great that it becomes necessary to install feeder voltage regulators at great expense. These feeder voltage regulators are subject to constant losses of far from negligible value and furthermore by reason of their high reluctance magnetic circuit draw a constant low power factor exciting current which for a low load factor low power factor substation may constitute several per cent of the total K V A load of the substation.

The great desirability of using capacity reactance for current limitation has long been appreciated but resonant difficulties with the usual lagging power factor loads has prevented its use as explained above.

It is the primary object of my present invention to provide a current limiter adapted to avoid, among others, the disadvantages and objections above pointed out while at the same time operative to instantly curb a current rise greatly in excess of normal and if said current rise tends to become still greater instantly operative to reduce the line current to a low value and at the same time maintain a high or leading power factor.

Now it is a well known fact that most short circuits consist of such things as lightning flash overs, or birds, rodents, small wires, etc., across the lines, nearly all such short circuits will almost instantly clear themselves, but usually the power current following such a short is so great that its interruption by normal line clearance is not possible. It is the further object of my invention to so limit the current upon the occurrence of a short circuit that normal line clearances will be able to clear up most of such short circuits without the necessity of opening the feeder circuit-breaker and thereby interrupting service on the shorted feeder.

It is the further object of my invention to provide a capacity reactance of such characteristic values as to somewhat more than compensate for normal line reactance and thus making the voltage regulation at the customer's load so good that in most cases feeder regulators may be omitted and where necessary their size, cost, losses, and leakage current may be reduced.

It is the further object of my invention to provide a preventive capacity reactance which will have a substantially constant equivalent ohmic value at line frequency throughout the normal current range of the feeder. Its equivalent ohmic value will rise above full load current at first slowly and then so fast that the value of the current will reduce even though the short circuit is very severe.

Another object of the invention is to provide a novel arrangement of reactance and capacitance in an alternating current circuit to comprise a combination voltage regulator and current limiter.

With these objects in view, the current limiting device of my invention comprises a reactance and a capacitance in parallel with each other and in series with the load, the reactance and capacitance being designed to have such inherent characteristics that resonance therebetween can occur only at values of line current and voltage at or in the neighborhood of normal.

In order to illustrate the fundamentals of my invention, I have shown in the accompanying drawings; in Figures 1 and 4 diagrams of circuit embodying the invention; in Figure 3 a vertical sectional view of a reactance embodied in the invention, and in Figure 2 a set of curve diagrams of current-voltage values for the elements of the current limiting device between no load and normal full load; Fig. 5 is a diagram showing the voltage-current characteristics of the circuit shown in Fig. 4.

In the above referred to drawings, like reference characters indicate like parts throughout.

Referring now to Figure 1 of the drawings the reference characters 1, 2 and 3 indicate respective ones of busses in a station bus arrangement in a three phase system of a given frequency from which the single phase feeders 4 and 5 are tapped off. In said feeders 4 and 5 are the switches 6 and 7, respectively, but these can be circuit breakers operated by current from current transformers, not here shown, but well known in use and practice. In series in said line 4 is a current regulator of the invention comprising a reactance coil 8 through which is a closed core 9 which is adapted to become saturated at a predetermined voltage which is a fraction of the normal line voltage. In parallel with said coil 8 is a condenser 10 which has sufficient capacity both to cause saturation in said core 9 and also to produce a predetermined line regulation in the feeders 4, 5, and a load 12, 12 connected across said feeders 4, 5.

The diagram of Figure 2 shows a line B which is plotted along voltage-current values of said condenser 10 and a line A which is the voltage-current curve for said reactance 8, 9. Said curves A and B cross at a point which is indicated on the abscissa as being at substantially 100% normal voltage and 1,100% normal current. The saturation point of said reactance 8, 9 is indicated as being at 15.5% normal voltage and 20% normal current. At 100% or normal load current through said device, that is resultant flow, the voltage across the device is approximately 10% of normal or full voltage. At this voltage the current in the condenser circuit is approximately 110% normal and the current in the reactor coil is approximately 10% normal. At 150% line current there is indicated a current of 170% normal in the condenser circuit and a reactor current of 20% normal with a voltage of approximately 15.5% normal across the device. At 100% normal line voltage across the device there is shown eleven times normal feeder current in both the reactor and the condenser circuits. The current flowing in the feeders 4, 5 will be only that required to excite the device, while a short circuit to produce such a result would have to be of low impedance and have to be located closely adjacent to the device.

In Figure 4 of the drawings is shown a circuit diagram of a three phase circuit with a device of the invention connected in series in each of the phase feeders 1, 2 and 3. In Figure 5 the current and voltage values in the circuit and at different parts thereof for different voltages and load current are indicated. In Fig. 5 the voltage-current curve characteristics are similar to that shown in Fig. 2 with the exception that the abscissa is shown in actual voltage values and the ordinates is representative of actual current values in the circuit instead of percentages of voltage-current characteristics of normal voltage and current.

I do not wish to limit myself to the exact uses or purpose shown as it is evident that this device may be adjusted to pass a small leading current at full voltage if the coil 8 is given more turns or it may be adjusted to give a small lagging current at full voltage if the coil 8 is given less turns. For instance if the power factor is made to change from leading to lagging at high voltages across the device this characteristic may be used for relay operation since only a very severe short circuit would cause such a charge. The amount of limitation can be adjusted as shown above so that there will be a tendency for the voltage to instantly build up when the fault is removed or for the current to be locked out of the circuit until the circuit opening device D operates. It is of course not expected that the current will pass through a zero value as shown in Figure 2. These curves show the tendency of the current to flow but the presence of harmonics in the reactor circuit and the presence of losses in both circuits will obviously cause a considerable current to flow even at a voltage value where the reactor reactance and the capacity reactance are nominally equal.

I do not limit myself to the specific arrangement of my novel means as illustrated in the drawing and as above described in detail, the same merely representing an illustrative form thereof which embodies the principles upon which the invention is based, and it is deemed within the scope of my invention, as defined in the appended claims, to make various alterations in the arrangements of the system, as well as to substitute various equivalents for the various specific devices of the invention.

I claim:—

1. In an alternating current circuit having a substantially constant frequency and given normal load voltage and current, in combination, in series in said circuit a condenser and a reactance in parallel with each other, said reactance having a closed magnetic core which becomes saturated at comparatively low voltage and said reactance and condenser having respective voltage-current curves which meet each other at said normal voltage and current values of the circuit.

2. In an alternating current circuit having a substantially constant frequency and given normal load voltage and current, in combination, in series in said circuit a condenser and a reactance in parallel with each other, said reactance having a closed magnetic core which becomes saturated at comparatively low voltage and said reactance and condenser having respective voltage-current curves which approach each other and which meet each other at said normal voltage and current values of the circuit.

3. In an alternating current circuit having a substantially constant frequency and given normal load voltage and current, in combination, in series in said circuit a condenser and a reactance in parallel with each other, said reactance having a closed magnetic core adapted for saturation at comparatively low voltage and said reactance and condenser having respective voltage-current curves which approximate each other within the range of said normal voltage and current values of the circuit.

4. In combination, a condenser and a reactance connected in parallel with each other, said reactance having a closed magnetic core which becomes saturated at a given voltage value and said reactance and condenser having respective voltage-current curves which meet each other at a point on the reactance voltage-current curve which is at or above said given voltage value.

In testimony, that I claim the invention set forth above I have hereunto set my hand this 14th day of October, 1927.

FRAZER W. GAY.